(12) United States Patent
Chen et al.

(10) Patent No.: US 6,524,421 B1
(45) Date of Patent: Feb. 25, 2003

(54) COLD ISOPRESSING METHOD

(75) Inventors: Jack C. Chen, Getzville, NY (US); Valerie M. Stawisuck, North Tonawanda, NY (US); Ravi Prasad, East Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/668,249

(22) Filed: Sep. 22, 2000

(51) Int. Cl.$^7$ ................................................ B29B 11/12
(52) U.S. Cl. ..................... 156/245; 156/242; 156/89.11; 156/89.28; 425/393; 428/34.4; 264/628; 264/632; 264/635; 264/650; 210/500.25
(58) Field of Search ........................... 156/89.11–89.19, 156/89.25–89.28, 244.12, 244.26, 244.27, 245, 246, 285, 242; 425/78, 79, 393; 428/546, 547, 570, 34.4; 264/628, 632, 635, 650, 667, 668; 210/483, 484, 493.5, 500.25; 55/486–489

(56) References Cited

U.S. PATENT DOCUMENTS

| | | | |
|---|---|---|---|
| 4,486,385 A | 12/1984 | Aslund | 419/48 |
| 4,500,406 A * | 2/1985 | Weyand et al. | 204/293 |
| 4,514,158 A | 4/1985 | Pettersson | 425/78 |
| 4,541,975 A | 9/1985 | Honma et al. | 264/62 |
| 4,571,312 A | 2/1986 | Greskovich et al. | 264/1.2 |
| 4,629,483 A * | 12/1986 | Stanton | 55/487 |
| 4,997,604 A | 3/1991 | Hofer et al. | 264/65 |
| 5,151,660 A * | 9/1992 | Powers et al. | 324/663 |
| 5,173,229 A | 12/1992 | Miyamoto | 264/59 |
| 5,240,480 A | 8/1993 | Thorogood et al. | 96/4 |
| 5,391,440 A | 2/1995 | Kuo et al. | 429/27 |
| 5,417,917 A | 5/1995 | Takahar et al. | 419/2 |
| 5,439,706 A | 8/1995 | Richards et al. | 427/244 |
| 5,494,700 A | 2/1996 | Anderson et al. | 427/115 |
| 5,603,876 A | 2/1997 | Honma et al. | 264/65 |
| 5,631,029 A | 5/1997 | Bewlay et al. | 425/78 |
| 5,665,291 A | 9/1997 | Honma et al. | 264/666 |

(List continued on next page.)

FOREIGN PATENT DOCUMENTS

CA 1173308 * 8/1984 ........... B01D/13/04

OTHER PUBLICATIONS

Teraoka et al., Development of Oxygen Semipermeable Membrane using Mixed Conductive Perovskite–Type Oxides, Jour. Ceram. Soc. Japan International Ed, vol. 97, No. 4 (1989) pp 458–462.

Teraoka et al., "Preparation of Dense Film of Perovskite––Type Oxide on Porous Substrate", Jour. Ceram. Soc. Japan International Ed, vol. 97, No. 5 (1989) pp 523–529.

Pal et al. "Electrochemical Vapor Deposition of Yttria–Stabilized Zirconia Films", from Proceedings of the First International Symposium on Solid Oxide Fuel Cells, vol. 89–11 (1989) pp 41–56.

*Primary Examiner*—Michael W. Ball
*Assistant Examiner*—Jessica Rossi
(74) *Attorney, Agent, or Firm*—David M. Rosenblum (57) ABSTRACT

A cold isopressing method in which two or more layers of material are formed within an isopressing mold. One of the layers consists of a tape-cast film. The layers are isopressed within the isopressing mold, thereby to laminate the layers and to compact the tape-cast film. The isopressing mold can be of cylindrical configuration with the layers being coaxial cylindrical layers. The materials used in forming the layers can contain green ceramic materials and the resultant structure can be fired and sintered as necessary and in accordance with known methods to produce a finished composite, ceramic structure. Further, such green ceramic materials can be of the type that are capable of conducting hydrogen or oxygen ions at high temperature with the object of utilizing the finished composite ceramic structure as a ceramic membrane element.

21 Claims, 3 Drawing Sheets

U.S. PATENT DOCUMENTS

| | | | | |
|---|---|---|---|---|
| 5,711,833 A | * | 1/1998 | Apte et al. | 156/89 |
| 5,735,985 A | | 4/1998 | Ghosh et al. | 156/89 |
| 5,779,833 A | * | 7/1998 | Cawley et al. | 156/89.11 |
| 5,855,997 A | * | 1/1999 | Amateau | 428/212 |
| 5,904,966 A | * | 5/1999 | Lippens | 428/36.91 |
| RE36,249 E | | 7/1999 | Zeller | 55/523 |
| 6,165,431 A | * | 12/2000 | Mackay et al. | 423/219 |

* cited by examiner

COLD ISOPRESSING METHOD

STATEMENT OF GOVERNMENT RIGHTS

This invention was made with Government support under DE-FC26-99FT40437 awarded by the Department of Energy. The Government has certain rights in this invention.

FIELD OF THE INVENTION

The present invention relates to a cold isopressing method in which a green material is compacted within an isopressing mold. More particularly, the present invention relates to such a method in which two or more layers of green ceramic material are laminated within the isopressing mold and one of the layers is a tape-cast film. Even more particularly, the present invention relates to such a method in which the laminated layers are used to form a ceramic membrane element capable of selectively transporting oxygen or hydrogen ions.

BACKGROUND OF THE INVENTION

Cold isopressing is a well-known technique that is used to form filters, structural elements and membranes. In isostatic pressing, a granular form of the material to be compacted is placed within an elastic isopressing mold. The granular material can be a ceramic or metallic powder or in case of ceramics can be a mixture of powder, binder and plasticizing agents. The isopressing mold is then positioned within a pressure vessel and slowly subjected to a hydrostatic pressure with cold or warm water to compact the granular material into a green form which subsequently, as appropriate, can be fired and sintered. An example of such a process that is applied to the formation of Tungsten rods is disclosed in U.S. Pat. No. 5,631,029. In this patent, fine Tungsten powder is isostatically pressed into a tungsten ingot.

Various green ceramics have been manufactured by isostatically pressing green ceramic materials. The isopressing molds can be cylindrical, as has been described above with reference to Tungsten ingots, or can be flat to produce plate-like articles. An important application for ceramic materials is to produce ceramic membrane elements to separate oxygen or hydrogen from feed streams. Such ceramic materials, while impermeable to the oxygen or hydrogen, conduct ions of oxygen or hydrogen to effect the separation. In practice, the ceramic is subjected to a high temperature and the oxygen or hydrogen is ionized at one surface of the membrane. The ions travel through the membrane and recombine at the other side thereof to emit electrons. The electrons are conducted through the ceramic material itself or through a separate electrical pathway for ionization purposes.

For example, a class of such materials, known as mixed conductors conduct both oxygen ions and electrons. These materials are well suited for oxygen separation since they can be operated in a pressure driven mode, that is a difference in oxygen activity on the two sides of the ceramic drives the oxygen transport. Perovskites such as $La_{1-x}Sr_xCoO_{3-y}$, $La_xSr_{1-x}FeO_{3-y}$, $La_xSr_{1-x}Fe_{1-y}Co_yO_{3-z}$ are examples of mixed conductors. At elevated temperatures, these materials contain mobile oxygen-ion vacancies $[V_O \ldots]$ that provide conduction sites for transport of oxygen ions through the material. Oxygen ions are transported selectively, and can thus act as a membrane with an infinite selectivity for oxygen. The oxygen transport involves the following chemical reactions:

Surface reaction

Reaction within the electrolyte

The oxygen ions annihilate the highly mobile oxygen ion vacancies in the electrolyte. Electrons must be supplied (and removed at the other end of the membrane) for this reaction to proceed.

An oxygen partial pressure differential across the membrane gives rise to an electromotive force (emf) termed as Nernst potential, and is given by the following equation:

$$V=(RT/zF)ln(P_{O_2,2}/P_{O_2,1})$$

where,

R=the gas constant (8.314 J/gmole-K)

T=temperature (K)

F=Faraday's constant (96488 Coulomb/gmole)

$Po_2$, 1 and $Po_2$, 2=partial pressure of oxygen on the opposite sides of the membrane z=the number of electrons given up by one oxygen molecule, i.e. 4

The Nernst potential is developed internally, and it drives the flux of oxygen vacancies against the ionic resistance of the electrolyte. Thin films are therefore highly desirable because the ideal oxygen flux is inversely proportional to the thickness of the membrane. Thus, thinner films can lead to higher oxygen fluxes, reduced area, lower operating temperatures and smaller $O_2$ pressure differentials across the electrolyte.

The thin films of ceramic are, however, fragile and must be supported. Therefore, efforts have been aimed at development of the thin film technology involving the deposition of a dense oxygen transport membrane film on a suitable porous substrate.

Solid state gas separation membranes, formed by depositing a dense mixed conducting oxide layer onto a porous mixed conducting support are disclosed in Yasutake Teraoka et al. "Development of Oxygen Semipermeable Membrane Using Mixed Conductive Perovskite-Type Oxides" Jour. Ceram. Soc. Japan. International Ed, Vol. 97, No. 4, pp 458–462, 1989 and Yasutake Teraoka et al. "Preparation of Dense Film of Perovskite-Type Oxide on Porous Substrate", Jour. Ceram. Soc. Japan, International Ed. Vol. 97, No. 5, pp 523–529, 1989. The relatively thick porous mixed conducting supports disclosed in these references provide mechanical stability for the thin, relatively fragile, dense mixed conducting layers. In these references, thin films composed of $La_{0.6}Sr_{0.4}CoO_3$ were deposited onto porous supports of the same material by rf sputtering and liquid suspension spray deposition. The films produced by sputtering proved to be cracked and porous. Thin films (less than 15 μm in thick thickness) made by liquid suspension spraying followed by sintering at 1400° C. were dense and crack-free. Pal et al. "Electrochemical Vapor Deposition of Yttria-Stabilized Zirconia Films" from the Proceedings of the First International Symposium on Solid Oxide Fuel Cells, Vol. 89–11, pp 41–56, 1989 discloses an EVD process in which yttria-stabilized zirconia electrolyte films are deposited onto a porous substrate. EVD is a modification of the conventional chemical vapor deposition process which utilizes a chemical potential gradient to grow thin, gas impervious layers of either electronically, or ionically conducting metal oxides on porous substrates. The process involves contacting a mixture of metal halides on one side of a porous substrate and a mixture of hydrogen and water on the opposite side. The reactants diffuse into the substrate pores and react to form the multicomponent metal oxide that is deposited on the pore wall. Continued deposition, however, causes pore narrowing until eventually the pores are plugged with the multicomponent metal oxide.

U.S. Pat. No. 5,240,480 discloses an organometallic chemical deposition (OMCVD) method to prepare thin films of muticomponent metallic oxides for use as inorganic membranes. The inorganic membranes are formed by reacting organometallic complexes corresponding to each of the respective metals and an oxidizing agent under conditions sufficient to deposit a thin membrane onto the porous substrate.

Both EVD and OMCVD process involve expensive and complex equipment and often toxic and expensive precursor materials. Furthermore, it is difficult to control the stoichiometry of multicomponent metallic oxides (e.g. mixed conducting perovskites) deposited by such processes.

U.S. Pat. No. 5,494,700 discloses a precipitate- free aqueous solution containing a metal ion and a polymerizable organic solvent to fabricate dense crack- free thin films (<0.5 $\mu$m/coating) on dense/porous substrates for solid oxide fuel cell and gas separation applications. The method comprises first preparing a precipitate-free starting solution containing cations of oxide's constituents dissolved in an aqueous mixture comprising a polymerizable organic solvent. The precursor film is deposited on the substrate by a spin-coating technique. The deposition is followed by drying and calcining in the presence of oxygen and at the temperatures below 600° C. to convert the film of polymeric precursor into the metal oxide film.

All of the foregoing techniques have limited applicability to the fabrication of tubular ceramic membranes in that it is difficult to utilize such techniques to apply a dense layer on the inside of a tubular substrate. A major disadvantage of colloidal sol., slurry or polymeric precursor liquid based process is the difficulty of effectively coating substrates of large pore size, especially when the pore size exceeds 20 $\mu$m. Usually, multiple coatings or different fabricating steps are needed to reduce the surface pore size and/or porosity to avoid the penetration of the coating solution. Additionally, these techniques generally require the close matching of shrinkage between the coating and substrate upon firing.

As will be discussed, the present invention provides a method useful in the manufacture of a composite structure that is very amenable to fabricating tubular composite structures having an internally located thin film layer. Furthermore, unlike prior art techniques, the present invention is capable of forming composite structures in which thin films are deposited on large pore size substrate. Other advantages will be apparent from the following discussion.

SUMMARY OF THE INVENTION

The present invention provides a cold isopressing method in which at least two layers of material are isopressed within an isopressing mold, thereby to laminate the at least two, layers and to compact at least the one of the at least two layers. One of the at least two layers consists of a tape-cast film. A further of the at least two layers can be formed by a granular form of a material.

The present invention can be applied to form ceramic membrane elements in which all layers contain ceramic materials (which can be different or the same materials) capable of oxygen or hydrogen selectivity at high temperatures. In such case, the resultant green ceramic would be removed from the isopressing mold and then fired to remove organic additives such as binders and plasticizing agents and then sintered to form a composite ceramic in accordance with known methods. Alternatively, the isopressing mold being fabricated from a plastic or rubber might be left intact and burned away during firing or sintering.

The invention is not, however, limited to the fabrication of ceramic membranes. The process of the present invention can be adapted to fabricate any composite film devices including non-oxygen conductor composite porous membranes for gas or liquid separation and filtration applications, e.g. carbon or zeolite composite films. Also, the materials of and the porous support and membrane can be other ceramic or metallic materials or mixtures thereof. Furthermore the application of present invention is not limited to any particular shapes. For instance, plates, rods, bars and tubes fall within the purview of the present invention.

Although the isopressing mold can be a known flat isopressing mold to form a sheet-like composite, it can also be of cylindrical configuration with the at least two layers being of coaxial cylindrical layers. The one of the at least two coaxial cylindrical layers can be formed by wrapping the tape-cast film around a mandrel of the isopressing mold. The tape-cast film can contain a ceramic. A further of the at least two coaxial cylindrical layers can be formed by introducing a granular material that can be a ceramic forming material into an annular space defined between the tape-cast film and an outer, cylindrical pressure bearing element of the isopressing mold. As used herein and in the claims, the term "granular form" means either a powder or a powder mixed with additives such as in the case of a ceramic, plasticizing agents, binders, and etc. Further, the term "ceramic forming material" means either a ceramic powder or a ceramic powder mixed with additives. In case of an application of the present invention to the fabrication of ceramic membranes, the tape-cast film wrapped around the mandrel of the isopressing mold can form a dense layer inside the finished tubular, ceramic membrane to overcome the problem of forming such a layer on the inside of a tubular form. It should also be pointed out that since the tapes are in plastic form, there is no penetration of the solution into an adjacent layer. As a result, the adjacent support layer can be fabricated with large pore sizes, namely, above 20 $\mu$m.

Another possibility contemplated by the present invention is that the other of the at least two coaxial cylindrical layers is a compacted tube of a granular form of a material, again possibly a ceramic forming material. In such case, the one of the at least two coaxial cylindrical layers is then formed by wrapping the tape-cast film around said compacted tube. In this regard, such a compacted tube might have sub-layers containing pore forming materials to provide active and inert supporting layers to a dense layer formed by the tape-cast film. As a result, a dense layer can also (or in addition to a dense layer on the inside of a tube) be formed on the outside of such a tubular membrane.

The tape-cast film can comprise a mixed conducting oxide capable of conducting one of hydrogen and oxygen ions and the other of the at least two coaxial cylindrical layers can contain a pore forming material. Thus, the present invention can be used to form a dense layer supported by a porous support. The other of the at least two coaxial cylindrical layers can also contain the mixed conducting oxide so that such support constitutes an active support. However, both layers do not have to have the same mixed conducting oxide and as such, the other of the at least two coaxial cylindrical layers can contain another mixed conducting oxide.

Preferably, the one of the at least two layers has a first thickness of between about 10 and about 200 $\mu$m and the other of the at least two layers has a second thickness of between about 0.2 and about 5.0 mm after lamination.

The mixed conducting oxide can have a structure given by the formula: $A_xA'_{x'}A''_{x''}B_yB'_{y'}B_{y''}O_{3-z}$, where A, A', A" are chosen from the groups 1, 2, 3 and the f-block lanthanides; and B, B', B" are chosen from the d-block transition metals according to the Periodic Table of the Elements adopted by the IUPAC. In the formula, $0 \leq x \leq 1$, $0 \leq x' \leq 1$, $0 \leq x'' \leq 1$, $0 \leq y \leq 1$, $0 \leq y' \leq 1$, $0 \leq y'' \leq 1$ and z is a number which renders the compound charge neutral. Preferably, each of A, A', and A" is magnesium, calcium, strontium or barium.

Another possible structure for the mixed conducting oxide is one given by the formula: $A'_sA''_tB_uB'_vB''_wO_x$ where A represents a lanthanide, Y, or mixture thereof, A"0 represents an alkaline earth metal or mixture thereof; B represents Fe; B' represents Cr, Ti, or mixture thereof and B" represents Mn, Co, V, Ni, Cu or mixture thereof. Each of s, t, u, v, and w represent a number from 0 to about 1. Further, s/t is between about 0.01 and about 100, u is between about 0.01 and about 1, and x is a number that satisfies the valences of A, A', B, B', and B" in the formula. Additionally, $0.9 < (s+t)/u+v+w) < 1.1$.

BRIEF DESCRIPTION OF THE DRAWINGS

While the specification concludes with claims distinctly pointing out the subject matter that applicants regard as their invention, it is believed that the invention will be better understood when taken in connection with the accompanying drawings in which:

None of the Figures have been drawn to scale. It is understood that the length of the isopressing mold could be much longer than that shown. Furthermore, the thickness of layers of materials has been exaggerated for illustrative purposes.

DETAILED DESCRIPTION

Figure 1:
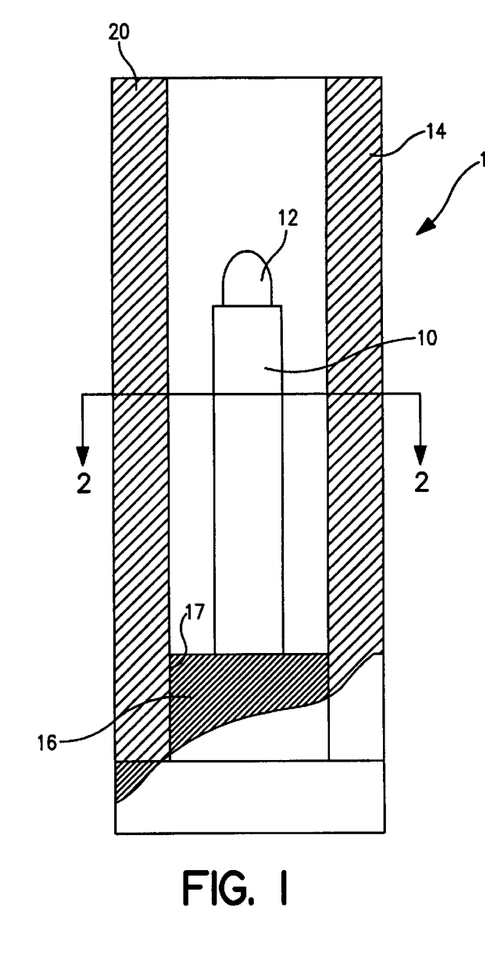
FIG. 1 illustrates a schematic view, with portions broken away, of an isopressing mold for carrying out a method of the subject invention after a tape-cast film has been wrapped around a mandrel of such isopressing mold.
Figure 2:
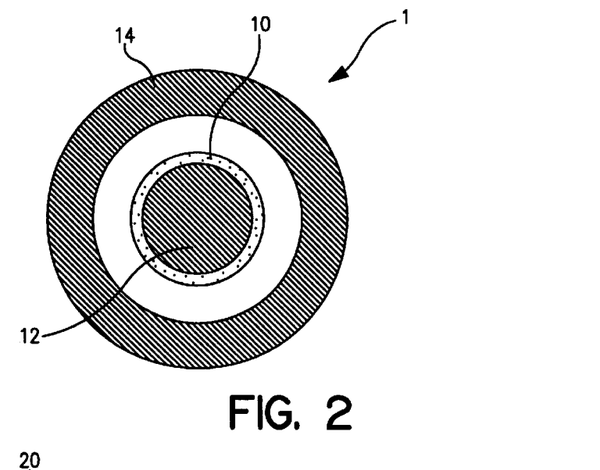
FIG. 2 is a sectional view taken along line 2—2 of FIG. 1.

With reference to FIGS. 1 and 2, an isopressing mold 1 is illustrated of the type that is used in forming a closed end tube. A first layer of material has been formed within isopressing mold 1 by a tape- cast film 10.

Isopressing mold 1 includes a mandrel 12 and a cylindrical pressure bearing element 14. Tape cast film is wrapped around mandrel 12 to form the first layer of material. Mandrel 12 and cylindrical pressure bearing element 14 are connected to one another by telescoping base portion 16 of mandrel 12 into an enlarged end bore 17 of cylindrical pressure bearing element 14. Mandrel 12 and cylindrical pressure bearing element 14 are not, however, fixedly joined to allow isopressing mold 1 to be disassembled at the conclusion of the isopressing process.

As will be discussed, tape-cast film 10 is formed in a conventional manner from a ceramic slurry and plasticizer that has been cast into a thin layer on a polymer and allowed to dry. Thereafter, a sheet of the tape-cast film 10 is wrapped around mandrel 12 while separating the polymer from the sheet.

Figure 3:
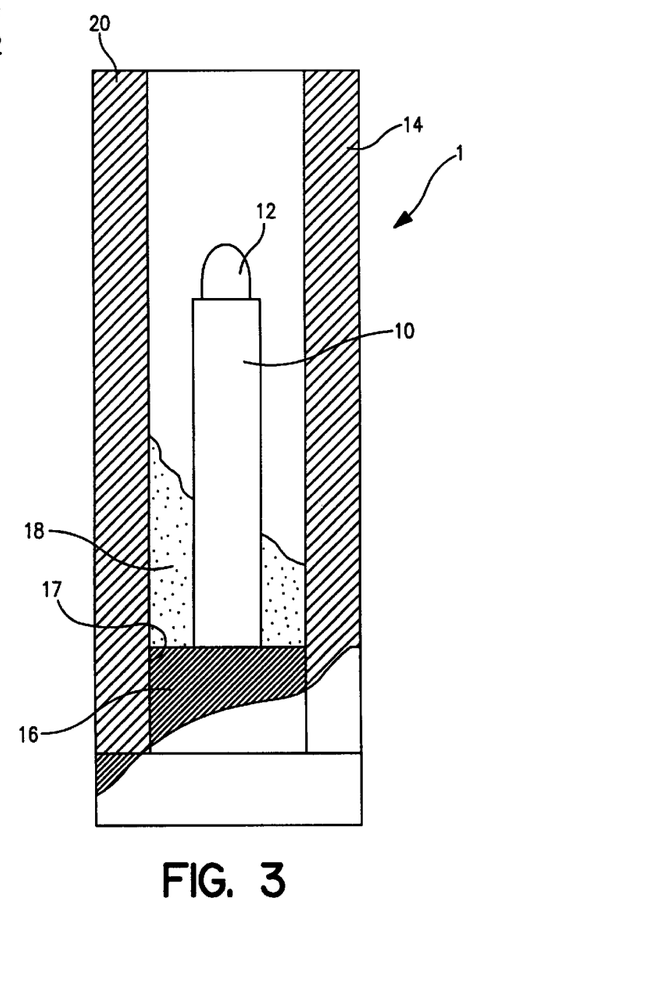
FIG. 3 illustrates the isopressing mold shown in FIG. 1 while being filed with a granular ceramic powder after the wrapping of the tape-cast film.

With added reference to FIG. 3, a further layer of material is formed within isopressing mold 1 by a ceramic material 18 of granular form. Ceramic material 18 is introduced into an end 20 of cylindrical pressure bearing element 14 to fill the annular space defined between tape-cast film 10 and cylindrical pressure bearing element 14.

Ceramic material 18 can comprise a ceramic powder or a mixture containing a ceramic powder, an organic binder, and a plasticizing agent. In order to facilitate the introduction of ceramic material 18 into isopressing mold 1, isopressing mold 1 can be rested on a vibrating surface of a vibrator. Vibrations transmitted through base portion 16 of mandrel 12 are transmitted to cylindrical pressure bearing element 14. The use of a vibrator is particularly preferred when long ceramic tubes are to be formed in that it prevents hang up of ceramic material 18 without the need to resort to tamping and the like.

Figure 4:
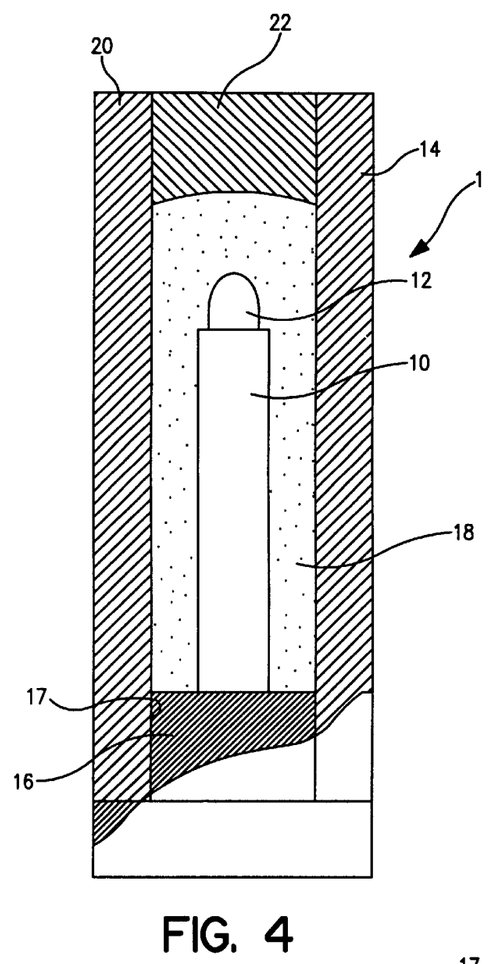
FIG. 4 illustrated the isopressing mold of FIG. 1 fully filled and sealed.

With reference to FIG. 4, after isopressing mold 1 is filled, an end cap 22 is inserted into end 20 of cylindrical pressure bearing element 1. End cap 22 thereby completes the sealing of isopressing mold 1. As illustrated, end cap 22 is configured to provide a slight clearance with mandrel 12 to produce a finished ceramic tube having a closed end. The inner surface of end cap 22 is rounded to round the desired closed end of the ceramic tube. As may be appreciated, end cap 22 could be constructed to touch mandrel 12 so that the finished ceramic tube was open ended.

Figure 5:
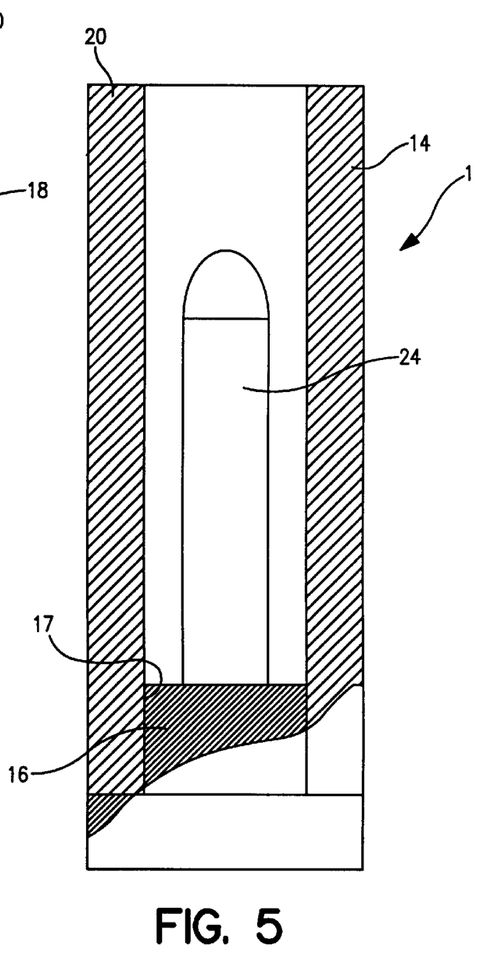
FIG. 5 illustrates the isopressing mold of FIG. 1 after relaxation of hydrostatic pressure and with the isopressing mold partially disassembled.

Isopressing mold 1 in the state shown in FIG. 4 is then immersed in cold or warm water and subjected to hydrostatic pressure. The exact pressure and time of course will vary with the actual dimensions of isopressing mold 1. With additional reference to FIG. 5, after the end of the isopressing molding, a green ceramic tubular form 24 is produced in which the two layers of material formed by tape cast film 10 and ceramic material 18 have been compacted and laminated to one another. Isopressing mold 1 can then be disassembled removing end cap 22 (as illustrated) and separating cylindrical tube 14 from mandrel 12. Green ceramic tubular form 24 may then be removed from mandrel 12 for further processing such as by firing and sintering.

Figure 6:
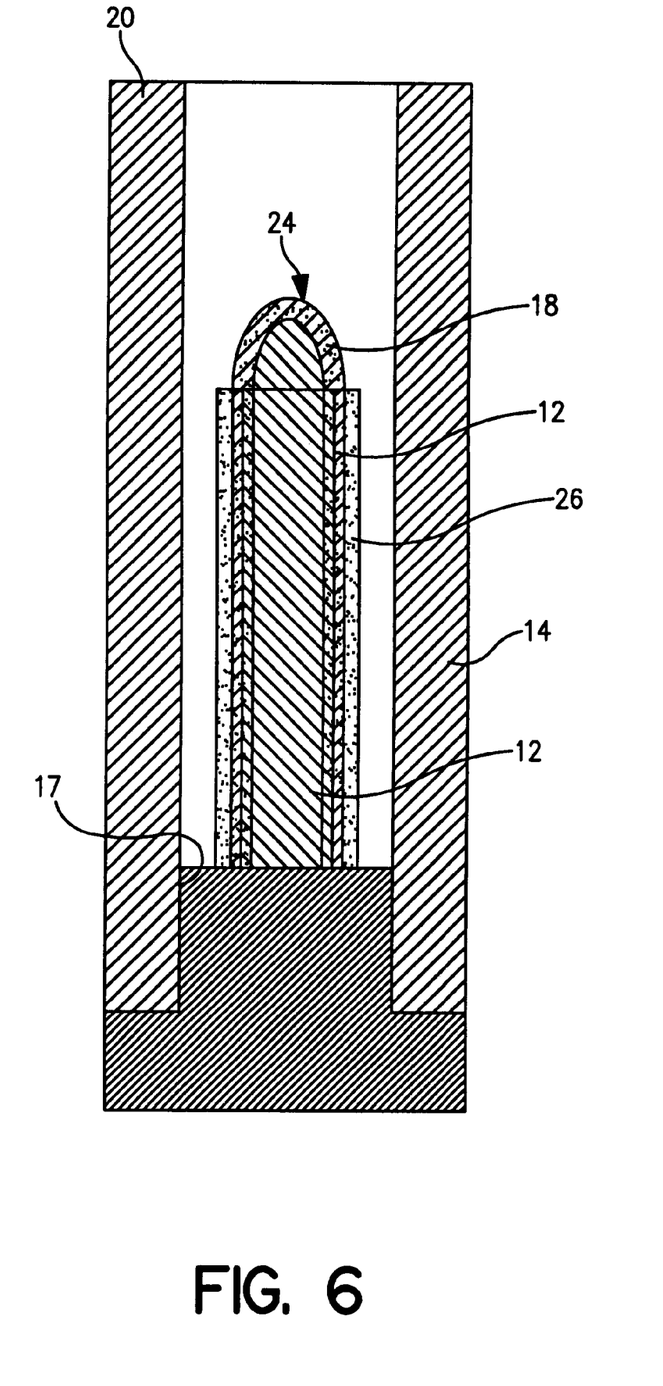
FIG. 6 illustrates a cross-sectional view of the isopressing mold of FIG. 1 after a tape-cast film has been wrapped around the green ceramic, tubular form shown in FIG. 5.

Alternatively, as shown in FIG. 6, another tape-cast film 26 may then be wrapped around green ceramic tubular form 24 to form an additional layer of material. Although not illustrated, isopressing mold 1 could then be resealed and subjected to hydrostatic pressure to compact and laminate tape-cast film 26 to green ceramic tubular form 24. After firing, the finished ceramic tube would have inner and outer dense layers. If the ceramic material 18 were provided with pore formers, the inner and outer dense layers would sandwich the porous layer. Another possibility is to cast additional layers onto green ceramic tubular form 24 by adding more ceramic material in place of or in addition to tape-cast film 24. If an inner dense layer is not required, granular ceramic material is compacted against mandrel 12 into a green ceramic tubular form with a subsequent lamination of a tape-cast film thereto. In fact, in any embodiment of the present invention, several layers of either granular ceramic materials or tape-cast film could be used. Such layers could be of the same material in order to increase the thickness of the finished article. Different materials could be used, for instance, to form active and inert porous supporting layers in a ceramic membrane used for separation purposes.

Cylindrical element 14 is preferably made of a material, that for the given dimensions of cylindrical element 14, will result in a sufficient rigidity thereof that ceramic material 18 can be introduced into isopressing mold 1 (between cylindrical element 14 and mandrel 12) while cylindrical element 14 maintains its shape. In this regard, the concern here is to prevent wrinkling of cylindrical element 14 that could produce a hang up of ceramic material within the annular filling space formed between cylindrical element 14 and mandrel 12. Furthermore, such rigidity ensures that the transverse cross-section of such annular filling space will remain constant along the length of isopressing mold 1 so that the finished ceramic tube has a constant thickness. A further material consideration for cylindrical element 14 is that it must be sufficiently resilient to retract or equally pull away from the isopressing molded article to allow the finished green ceramic form to be removed from the isopressing mold after relaxation of hydrostatic pressure.

Preferably, cylindrical element 14 is fabricated from a material such as polyurethane with a hardness of 95A on the durometer scale. Hardnesses of between 75A and 75D on the durometer scale are also useful. Harder materials are preferred over softer materials because it has been found that ceramic materials tend not to adhere to harder materials.

In the event that the formed article is to function as a ceramic membrane element, the ceramic materials utilized for the layers can be a mixed conducting ceramic capable of conducting oxygen ions and electrons. Examples of mixed conducting ceramic materials are set forth in the following table.

Examples of Mixed Conducting Solid Electrolytes

| Material composition |
|---|
| 1. $(La_{1-x}Sr_x)(Co_{1-y}Fe_y)O_{3-\delta}$ ($0 \leq x \leq 1$, $0 \leq y \leq 1$, $\delta$ from stoichiometry) |
| 2. $SrMnO_{3-\delta}$ |
|     $SrMn_{1-x}Co_xO_{3-\delta}$ ($0 \leq x \leq 1$, $\delta$ from stoichiometry) |
|     $Sr_{1-x}Na_xMnO_{3-\delta}$ |
| 3. $BaFe_{0.5}Co_{0.5}YO_3$ |
|     $SrCeO_3$ |
|     $YBa_2Cu_3O_{7-\delta}$ ($0 \leq \delta \leq 1$, $\delta$ from stoichiometry) |
| 4. $La_{0.2}Ba_{0.8}Co_{0.8}Fe_{0.2}O_{2.6}$; $Pr_{0.2}Ba_{0.8}Co_{0.8}Fe_{0.2}O_{2.6}$ |
| 5. $A_xA'_{x'}A''_{x''}B_yB'_{y'}B''_{y''}O_{3-z}$ (x, x', x", y, y', y" and z all in 0–1 range) |
|     where: A, A', A" = from groups 1, 2, 3 and f-block lanthanides |
|             B, B', B" = from d-block transition metals |
| 6. (a) Co—La—Bi type:    Cobalt oxide    15–75 mole % |
|                             Lanthanum oxide    13–45 mole % |
|                             Bismuth oxide    17–50 mole % |
|    (b) Co—Sr—Ce type:    Cobalt oxide    15–40 mole % |
|                             Strontium oxide    40–55 mole % |
|                             Cerium oxide    15–40 mole % |
|    (c) Co—Sr—Bi type:    Cobalt oxide    10–40 mole % |
|                             Strontium oxide    5–50 mole % |
|                             Bismuth oxide    35–70 mole % |
|    (d) Co—La—Ce type:    Cobalt oxide    10–40 mole % |
|                             Lanthanum oxide    10–40 mole % |
|                             Cerium oxide    30–70 mole % |
|    (e) Co—La—Sr—Bi type:    Cobalt oxide    15–70 mole % |
|                             Lanthanum oxide    1–40 mole % |
|                             Strontium oxide    1–40 mole % |
|                             Bismuth oxide    25–50 mole % |

-continued

| Material composition |
|---|
|    (f) Co—La—Sr—Ce type:    Cobalt oxide    10–40 mole % |
|                             Lanthanum oxide    1–35 mole % |
|                             Strontium oxide    1–35 mole % |
|                             Cerium oxide    30–70 mole % |
| 7. $Bi_{2-x-y}M'_xM_yO_{3-\delta}$ ($0 \leq x \leq 1$, $0 \leq y \leq 1$, $\delta$ from stoichiometry) |
|     where: M' = Er, Y, Tm, Yb, Tb, Lu, Nd, Sm, Dy, Sr, Hf, Th, Ta, Nb, Pb, Sn, In, Ca, Sr, La and mixtures thereof |
|               M = Mn Fe, Co, Ni, Cu and mixtures thereof |
| 8. $BaCe_{1-x}Gd_xO_{3-x/2}$ where, x equals from zero to about 1. |
| 9. One of the materials of $A_sA'_tB_uB'_vB''_wO_x$ family whose composition is disclosed in U.S. Pat. No. 5,306,411 (Mazanec et al.) as follows: |
|   |
| A represents a lanthanide or Y, or a mixture thereof; |
| A' represents an alkaline earth metal or a mixture thereof; |
| B represents Fe; |
| B' represents Cr or Ti, or a mixture thereof; |
| B" represents Mn, Co, V, Ni or Cu, or a mixture thereof; |
| and s, t, u, v, w, and x are numbers such that: |
| s/t equals from about 0.01 to about 100; |
| u equals from about 0.01 to about 1; |
| v equals from zero to about 1; |
| w equals from zero to about 1; |
| x equals a number that satisfies the valences of the A, A', B, B', B" in the formula; and $0.9 < (s + t)/(u + v + w) < 1.1$ |
| 10. One of the materials of $Ce_{1-x}A_xO_{2-\delta}$ family, where: |
|   |
| A represents a lanthanide, Ru, or Y; or a mixture thereof; |
| x equals from zero to about 1; |
| y equals from zero to about 1; |
| δ equals a number that satisfies the valences of Ce and A in the formula. |
| 11. One of the materials of $Sr_{1-x}Bi_xFeO_{3-\delta}$ family, where: |
|   |
| A represents a lanthanide or Y, or a mixture thereof; |
| x equals from zero to about 1; |
| y equals from zero to about 1; |
| δ equals a number that satisfies the valences of Ce and A in the formula. |
| 12. One of the materials of $Sr_xFe_yCo_zO_w$ family, where: |
|   |
| x equals from zero to about 1; |
| y equals from zero to about 1; |
| z equals from zero to about 1; |
| w equals a number that satisfies the valences of Sr, Fe and Co in the formula. |
| 13. Dual phase mixed conductors (electronic/ionic): |
|   |
| $(Pd)_{0.5}/(YSZ)_{0.5}$ |
| $(Pt)_{0.5}/(YSZ)_{0.5}$ |
| $(B-MgLaCrO_x)_{0.5}(YSZ)_{0.5}$ |
| $(In_{90\%}Pt_{10\%})_{0.6}/(YSZ)_{0.5}$ |
| $(In_{90\%}Pt_{10\%})_{0.5}/(YSZ)_{0.5}$ |
| $(In_{95\%}Pr_{2.5\%}Zr_{2.5\%})_{0.5}/(YSZ)_{0.5}$ |
| Any of the materials described in 1–13, to which a high temperature metallic phase (e.g., Pd, Pt, Ag, Au, Ti, Ta, W) is added. |
| 14. One of the materials of $A_{2-x}A'_xB_{2-y}B'_yO_{5+z}$ family whose composition is disclosed in WO 97/41060 (Schwartz et al.) as follows: |
|   |
| A represents an alkaline earth metal or a mixture thereof; |
| A' represents a lanthanide or Y, or a mixture thereof; |
| B represents a metal ion or mixtures of 3d transition metal ions and group 13 metals; |
| B' represents a metal ion or mixtures of 3d transition metal ions and group 13 metals, the lanthanides and yttrium; |
| $0 < x < 2$; $0 < y < 2$; z renders the compound charge neutral |
| 15. One of the materials of $Ln_xA'_xCo_yFe_{y'}Cu_{y''}O_{3-z}$ family whose composition is disclosed in EP 0 732 305 A1 (Dyer et al.) as follows: |
|   |
| Ln represents a f block lanthanide; |
| A' represents Sr or Ca; |
| $x > 0$, $y > 0$, $x + x' = 1$, $y + y' + y" = 1$, $0 < y \leq 0.4$ |
| z renders the compound charge neutral |

-continued

Material composition

16. One of the materials of $Ln_xA'_{x'}A''_{x''}B_yB'_{y'}B''_{y''}O_{3-z}\ O_{3-z}$ family whose composition is disclosed in EP 0 931 763 A1 (Dyer et al.) as follows:

Ln represents a f block lanthanide;
A' from groups 2;
A" from groups 1, 2, 3 and f-block lanthanides
B, B' from d-block transition metals excluding Ti and Cr
$0 \leq x < 1, 0 < x' \leq 1, 0 < y < 1.1, 0 \leq y' < 1.1, x + x' + x'' = 1.0,$
$1.1 > y + y' > 1.0$, z renders the compound charge neutral The following two examples describe oxygen transport membranes that were fabricated using different mixed conducting perovskite materials. These examples describe in detail the sample preparation of the tape-isopressing mold process used in the fabrication of LSC and LSFC composite oxygen transport membranes. They should not, however, be construed to limit the invention in any way.

EXAMPLE 1

The Fabrication of $La_{0.05}Sr_{0.95}CoO_{3-x}$ (LSC) Composite Oxygen Transport Membranes The slurry used in the tape casting of the thin dense film was prepared by combining approximately 65 parts of LSC to 35 parts of binder. 63.0 g LSC powder, 37.0 g Ferro binder B73210, and 200 g ⅜"mill media were placed into a 125 ml Nalgene bottle and allowed to roll on a jar mill for about 16 hours. It was then filtered through a 125-mesh monofilament nylon cloth and tape-cast onto MYLAR film by controlling the gap of the Doctor-blade to obtain a green thickness of 25–50 µm.

The substrate LSC+15 wt. % graphite was prepared by combining 60.0 g LSC, 10.6 g graphite, briquetting grade, and a few methacrylate mixing balls into a plastic vial. The vial was then inserted into a SPEX CertiPrep Mixer/Mill and mixed for 10 minutes.

The tape-cast film was first cut to fit the mandrel of the isopressing mold. For a mandrel that measured 9.5 mm in diameter (circumference=30 mm), the film was cut 60 mm wide to allow for two wraps of the film around the mandrel. The film was then snugly wrapped around the mandrel. The cylindrical pressure bearing element of the isopressing mold was placed over the mandrel and the powder for the porous substrate was slowly poured into the isopressing mold to the desired volume as the isopressing mold and mandrel were vibrated. The isopressing mold was then capped and isostatically pressed at 20 kpsi to form the composite green tube.

After the mandrel was withdrawn from the isopressed composite green tube, the tube was placed into a furnace and heated at a rate of 1° C. per minute, under ambient air, to a temperature of 450° C. and held for 1 hour to remove the binder and the pore former. The ramp was increased to 2° C. per min until the target of 1150° C. was reached. The temperature was then held constant for 2 hours to allow the tube to sinter in ambient air. The furnace was allowed to cool to room temperature at a rate of 2° C. per min.

SEM photomicrographs of the resultant composite showed that a dense crack-free LSC film was formed on the porous LSC substrate after sintering. The thickness of film was about 25 µm and the substrate porosity was about 32%. The composite LSC tubes were tested in a laboratory single tube reactor using different $O_2/N_2$ mixtures as a feed gas and He as a purge gas. The dense gas separation layer was faced to feed gas while the porous support was exposed to He inert purge gas. One of the composite OTM tubes showed an oxygen flux of 19.7 sccm/cm² at 1000° C. with 80% $O_2$ as a feed gas and He as a purge gas.

Flux performance and stability were also determined on composite discs formed of the materials outlined above and with a film thickness of ~25 µm and substrate thickness of ~0.8 mm. The oxygen permeation rate was measured using composite disc specimen sealed in an alumina test cell with gold paste. Permeation tests were performed at temperatures of 900–1000° C. with He inert gas purge and different concentrations of $O_2/N_2$ mixtures on the feed side. A HP 5890 Gas Chromatograph and oxygen analyzer were used to analyze the gas compositions and calculate the oxygen fluxes. With 80% $O_2$ in the feed, measurements were taken using a helium purge of 500 sccm He at 900, 950 and 1000° C. resulting in flux values of 13.5, 17.5 and 20.2 sccm/cm², respectively. The oxygen permeation increases as the temperature increases. The stability of LSC composite was tested at 1000° C. as a function of time under identical testing conditions. The oxygen fluxes measured were stable for more than ~96 hrs without showing flux degradation.

EXAMPLE 2

The Fabrication of $La_{0.2}Sr_{0.8}Fe_{0.8}Cr_{0.2}O_{3-x}$ (LSFC) Composite Oxygen Transport Membranes The slurry used in the tape casting of the thin dense film was prepared by combining approximately 65 parts of LSFC to 35 parts of binder. 63.0 g LSFC powder, 37.0 g Ferro binder B73210, and 200 g ⅜" mill media were placed into a 125 ml Nalgene bottle and allowed to roll on a jar mill for about 16 hours. It was then poured through a 125-mesh monofilament nylon cloth and tape-cast onto Mylar film to a green thickness of 50 µm.

The substrate LSFC+20 wt.% starch was prepared by combining 6.0 g LSFC, 15.0 g starch StarPol 469 WSP, and a few methacrylate mixing balls into a plastic vial. The vial was then inserted into a SPEX CertiPrep Mixer/Mill and mixed for 10 minutes.

The tape-cast film was first cut to fit the mandrel of the isopressing mold. For a mandrel that measured 9.5 mm in diameter (circumference=30 mm), the film was cut 60 mm wide to allow for two wraps of the film around the mandrel. The film was then snugly wrapped around the mandrel. The cylindrical pressure bearing element of the isopressing mold was placed over the mandrel and the powder for the porous substrate was slowly poured into the isopressing mold to the desired volume as the isopressing mold and mandrel were vibrated. The isopressing mold was then capped and isostatically pressed at 20 kpsi to form the composite green tube.

After the mandrel was withdrawn from the isopressed composite tube, the tube was placed into a slow-ramping furnace to allow for removal of the binder and starch. The furnace was heated at 0.5° C. per min to a temperature of 450° C. and held at that temperature for 1 hour. The temperature was then increased at a rate of 2° C. per min to 950° C., dwell equal to 1 hour. The furnace was then allowed to cool to room temperature to enable the transfer of the tube to a high temperature furnace. Once the transfer was complete, the ramp was set to 1° C. per min until a temperature of 450° C. was reached after which it was allowed to soak for 1 hour in ambient air. The ramp was increased to 2° per minute to 1250° C. in $N_2$ for a dwell time of two hours. The furnace was then allowed to cool to room temperature in air at a rate of 2° C. per min.

SEM photomicrographs of LSFC composite tube showed that a dense LSFC film was successfully formed on the inside of porous LSFC tubular substrate. Further, it was also found that the LSFC was deposited on the large pore size substrate with some surface pore size >100 µm. The thickness of LSFC film is ~50 μm with a good bonding between film and substrate.

The composite LSFC tubes were tested in a laboratory reactor. The porous support was exposed to fuel while the dense gas separation layer was exposed to air. One of the composite OTM tubes showed an oxygen flux of 11.3 sccm/cm$^2$ with 40% CH$_4$ in N$_2$ as the fuel. This is more than four times that obtained with dense walled tubes (1 mm thick) under identical testing conditions.

While the present invention has been described with reference to preferred embodiments, as will occur to those skilled in the art that numerous changes, additions and omissions can be made without departing from the spirit and scope of the present invention.

What is claimed is:

1. A cold isopressing method comprising:
   isopressing at least first and second layers of material within an isopressing mold by hydrostatic pressure applied to the isopressing mold, thereby to laminate said at least first and second layers and to compact the at least first layer;
   the mold being of cylindrical configuration and having a mandrel so that each of the at least first and second layers is of cylindrical, tubular configuration; and
   the at least first layer being introduced into the isopressing mold as a tape-cast film without pore formers and the at least second layer, in contact with the at least first layer, being a granular form of a material containing the pore formers.

2. The method of claim 1, further comprising:
   forming the at least first layer by wrapping the tape-cast film around a mandrel of said isopressing mold; and
   introducing said granular form of said material into an annular space defined between said tape-cast film and an outer, cylindrical pressure bearing element of said isopressing mold.

3. The method of claim 1, wherein:
   the at least second layer is a compacted tube of said granular form of said material; and
   the at least first layer is formed by wrapping the tape-cast film around said compacted tube.

4. The method of claim 1, wherein the tape-cast film comprises a mixed conducting oxide capable of conducting one of hydrogen and oxygen ions.

5. The method of claim 4, wherein the at least second layer also contains said mixed conducting oxide.

6. The method of claim 4, wherein the at least second layer also contains another mixed conducting oxide.

7. The method of claim 5 or claim 6, wherein:
   the at least first layer has a first thickness of between about 10 and about 200 μm; and
   the at least second layer has a second thickness of between about 0.2 and about 5 mm.

8. The method of claim 4, wherein the mixed conducting oxide is given by the formula: $A_xA'_{x'}A''_{x''}B_yB'_{y'}B_{y''}O_{3-z}$, where A, A', A" are chosen from the groups 1, 2, 3 and the f-block lanthanides; and B, B', B" are chosen from the d-block transition metals according to the Periodic Table of the Elements adopted by the IUPAC wherein $0 \leq x \leq 1$, $0 \leq x' \leq 1$, $0 \leq x'' \leq 1$, $0 \leq y \leq 1$, $0 \leq y' \leq 1$, $0 \leq y'' \leq 1$, and z is a number which renders the compound charge neutral.

9. The method of claim 8, wherein, each of A, A', and A" is magnesium, calcium, strontium or barium.

10. The method of claim 4, wherein the mixed conducting oxide is given by the formula: $A'_sA''_tB_uB'_vB''_wO_x$ where A represents a lanthanide, Y, or mixture thereof, A' represents an alkaline earth metal or mixture thereof; B represents Fe; B' represents Cr, Ti, or mixture thereof and B" represents Mn, Co, V, Ni, Cu or mixture thereof, s, t, u, v, and w each represents a number from 0 to about 1, s/t is between about 0.01 and about 100, u is between about 0.01 and about 1, x is a number that satisfies the valences of A, A', B, B', and B" in the formula, and 0.9<(s+t)/u+v+w)<1.1.

11. The method of claim 8 or claim 10, wherein the at least second layer also contains said mixed conducting oxide.

12. The method of claim 11, wherein:
   the at least first layer has a first thickness of between about 10 and about 200 μm; and
   the at least second layer has a second thickness of between about 0.2 and about 5 mm.

13. The method of claim 1, wherein:
   the at least first layer is formed by wrapping the tape-cast film around the mandrel of said isopressing mold;
   the granular form of said material is a ceramic forming material; and
   the at least second layer is formed by introducing said granular form of said material into an annular space defined between said tape-cast film and an outer, cylindrical pressure bearing element of said isopressing mold.

14. The method of claim 1, wherein:
   the at least second layer is a compacted tube of the granular form of said material;
   the granular form of said material is a ceramic forming material; and
   the at least first layer is formed by wrapping the tape-cast film around said compacted tube.

15. The method of claim 13 or claim 14, wherein the mixed conducting oxide is given by the formula: $A_xA'_{x'}A''_{x''}B_yB'_{y'}B_{y''}O_{3-z}$, where A, A', A" are chosen from the groups 1, 2, 3 and the f-block lanthanides; and B, B', B" are chosen from the d-block transition metals according to the Periodic Table of the Elements adopted by the IUPAC wherein $0 \leq x \leq 1$, $0 \leq x' \leq 1$, $0 \leq x'' \leq 1$, $0 \leq y \leq 1$, $0 \leq y' \leq 1$, $0 \leq y'' \leq 1$, and z is a number which renders the compound charge neutral.

16. The method of claim 15, wherein, each of A, A', and A" is magnesium, calcium, strontium or barium.

17. The method of claim 15, wherein the least second layer also contains said mixed conducting oxide.

18. The method of claim 15, wherein:
   the at least first layer has a first thickness of between about 10 and about 200 μm; and
   the at least second layer has a second thickness of between about 0.2 and about 5 mm.

19. The method of claim 13 or claim 14, wherein the mixed conducting oxide is given by the formula: $A'_sA''_tB_uB'_vB''_wO_x$, where A represents a lanthanide, Y, or mixture thereof, A' represents an alkaline earth metal or mixture thereof; B represents Fe; B' represents Cr, Ti, or mixture thereof and B" represents Mn, Co, V, Ni, Cu or mixture thereof, s, t, u, v, and w each represents a number from 0 to about 1, s/t is between about 0.01 and about 100, u is between about 0.01 and about 1, x is a number that satisfies the valences of A, A', B, B', and B" in the formula, and 0.9<(s+t)/u+v+w)<1.1.

20. The method of claim 19, wherein the at least second layer also contains said mixed conducting oxide.

21. The method of claim 19, wherein:
   the at least first layer has a first thickness of between about 10 and about 200 μm; and
   the at least second layer has a second thickness of between about 0.2 and about 5 mm.

* * * * *